United States Patent
Peters et al.

[11] Patent Number: 6,135,147
[45] Date of Patent: Oct. 24, 2000

[54] INTEGRATED VALVE CONTROL AND MONITORING ASSEMBLY

[75] Inventors: Mark Peters; Lisa Santos, both of Louisville, Ky.

[73] Assignee: Topworx, Inc., Louisville, Ky.

[21] Appl. No.: 09/325,083

[22] Filed: Jun. 3, 1999

Related U.S. Application Data

[60] Provisional application No. 60/088,050, Jun. 5, 1998.

[51] Int. Cl.[7] .................................................. F16K 37/00
[52] U.S. Cl. ...................... 137/556.3; 137/554; 137/556; 137/552
[58] Field of Search ..................... 137/554, 556, 137/553, 552, 556.3

[56] References Cited

U.S. PATENT DOCUMENTS

| | | |
|---|---|---|
| 607,286 | 7/1898 | Sharp . |
| 2,390,866 | 12/1945 | Blanchard . |
| 3,314,443 | 4/1967 | Flick et al. . |
| 4,046,350 | 9/1977 | Massey et al. . |
| 4,373,838 | 2/1983 | Foreman et al. . |
| 4,687,179 | 8/1987 | Smith . |
| 4,917,143 | 4/1990 | Grooms . |
| 4,967,792 | 11/1990 | Magee . |
| 5,178,187 | 1/1993 | Raymond, Jr. et al. . |
| 5,223,822 | 6/1993 | Stommes et al. . |
| 5,277,223 | 1/1994 | Glockner et al. . |
| 5,295,511 | 3/1994 | Schleinhege et al. . |
| 5,305,781 | 4/1994 | Raymond, Jr. et al. ................ 137/554 |
| 5,518,028 | 5/1996 | Walker . |
| 5,579,800 | 12/1996 | Walker . |
| 5,623,963 | 4/1997 | Stommes et al. . |
| 5,647,396 | 7/1997 | Stommes et al. . |
| 5,856,743 | 1/1999 | Juniman .............................. 137/554 X |

OTHER PUBLICATIONS

Westlock On–Line Catalog, "Accutrak Position Monitor." (Jun.18, 1999).
Westlock On–Line Catalog, "Accutrak Enclosures." (Jun. 18, 1999).
Westlock On–Line Catalog, "Beacon Visual Position Monitor." (Jun. 18, 1999).
Westlock On–Line Catalog, "Accutrak 1000 General Purpose." (Jun. 18, 1999).

(List continued on next page.)

*Primary Examiner*—Kevin Lee
*Attorney, Agent, or Firm*—Stites & Harbison, PLLC; David W. Nagle, Jr.; Vance A. Smith

[57] ABSTRACT

A valve control and monitoring assembly is mounted substantially alongside the upwardly extending auxiliary shaft of a rotary valve actuator, rather than directly above the auxiliary shaft. This valve control and monitoring assembly includes a targeting device and LEDs that provide for immediate visual indication as to the position of the driven valve, and may also include a pneumatic valve for effectuating opening and closing of the driven valve.

23 Claims, 6 Drawing Sheets

OTHER PUBLICATIONS

Westlock On–Line Catalog, "Accutrak 1200 General Purpose." (Jun. 18, 1999).
Westlock On–Line Catalog, "Accutrak 2000 General Purpose." (Jun. 18, 1999).
Westlock On–Line Catalog, "Accutrak 2200 General Purpose." (Jun. 18, 1999).
Westlock On–Line Catalog, "Accutrak 360 Explosion Proof." (Jun. 18, 1999).
Westlock On–Line Catalog, "Eliminator 3000 Explosion Proof." (Jun. 18, 1999).
Westlock On–Line Catalog, "Accutrak 4000 Explosion Proof." (Jun. 18, 1999).
Westlock On–Line Catalog, "Accutrak 5000 Intrinsically Safe." (Jun. 18, 1999).
Westlock On–Line Catalog, "Accutrak 6000 General Purpose." (Jun. 18, 1999).
Westlock On–Line Catalog, "Terminator 7000." (Jun. 18, 1999).
Westlock On–Line Catalog, "MCE 8000." (Jun. 18, 1999).
Westlock On–Line Catalog, "Accutrax 9000." (Jun. 18, 1999).
Westlock On–Line Catalog, "Accutrax RS&CS Position Transmitters." (Jun. 18, 1999).
Westlock On–Line Catalog, "Quantum Control Monitor." (Jun. 18, 1999).
Westlock On–Line Catalog, "Fallon Low Power Solenoids." (Jun. 18, 1999).
Westlock On–Line Catalog, "Quantum Enclosures." (Jun. 18, 1999).
Westlock On–Line Catalog,"Quantum General Purpose." (Jun. 18, 1999).
Westlock On–Line Catalog, "Quantum Non Incendive." (Jun. 18, 1999).
Westlock On–Line Catalog, "Quantum ExplosionProof." (Jun. 18, 1999).
Westlock On–Line Catalog, "Quantum Intrinsically Safe." (Jun. 18, 1999).
Westlock On–Line Catalog, "Quantumdual Coil General Purpose." (Jun. 18, 1999).
Westlock On–Line Catalog, "Quantum Dual Coil Nonincendive." (Jun. 18, 1999).
Westlock On–Line Catalog, "Quantum Dual Coil Explosion Proof." (Jun. 18, 1999).
Westlock On–Line Catalog, "Quantum Dual Coil Intrinsically Safe." (Jun. 18, 1999).
Stonel "Onyx" Product Brochure, Pub. No. 907–9/98 (Sep. 1998).
Stonel "Quartz" Product Brochure, Pub. No. 901–9/98 (Sep. 1998).
Stonel "Eclipse" Product Brochure, Pub. No. 909–9/98 (Sep. 1998).
Stonel "Solar" Product Brochure.
Automax "Aviator" Product Brochure, Pub. No. B00174–0 GU.
ASCO "Thermoplastic Position Indicators" Promotional Flier.
Asco Product Catalog, "Position Indicators," pp10–11.
Bray "2n1 Proxsensor" Product Brochure, Pub. No. B–1015 (Jun. 1995).
Topworx–Go Switch Product Catalog, pp. 123–126, 129–133.
Moniteur"Indicateur VPT" Product Specification Sheets, Form I2–0798.
Moniteur "Sentinel VPT" Product Specification Sheet, Form H1–0798.
Moniteur "Watchman VPT" Product Specification Sheet, Form H2–0798.
Moniteur "Survivor VPT" Product Specification Sheet, Form H3–0798.
Moniteur "Guardian VPT" Product Specification Sheet, Form H4–0798.

INTEGRATED VALVE CONTROL AND MONITORING ASSEMBLY

This application claims priority from U.S. provisional application Ser. No. 60/088,050 filed Jun. 5, 1998.

BACKGROUND OF THE INVENTION

The present invention relates to control and position monitoring devices for valves, and, more particularly, to an integrated control and monitoring assembly that can be directly mounted on an ISO (International Organization for Standardization) and NAMUR (Normen Arbeitsgen Mess Und Regeltechnik) standard rotary valve actuator.

Prior art valve control and monitoring assemblies are typically mounted on a bracket which, in turn, is secured to the actuator. The assembly often includes a pneumatic valve that selectively releases air into the actuator based on signals received by the control portion of the assembly, effectuating opening and closing of the valve by the actuator. An auxiliary shaft extends from the actuator and is received by the monitoring portion of the assembly. This auxiliary shaft rotates with the opening and closing of the valve. Based on the rotation of the auxiliary shaft, the monitoring portion of the assembly provides a visual indication of the position of the valve.

Prior art control and monitoring assemblies are typically mounted directly above the vertical auxiliary shaft that extends from the actuator. As these assemblies have improved and become more complex, they have been enclosed in a box-like housing. The housing, its contents, and its location require complex brackets and/or custom field modification for mounting. Moreover, the housing is often bulky and not easily mounted in all locations.

When such a valve position monitor is mounted to a valve in a particularly cramped or dark location, it may also be difficult for an observer to see the monitor's visual indications as to the position of the valve, i.e. whether the valve is open or closed.

It is thus an object of the present invention to provide an integrated control and monitoring assembly that may be simply and advantageously mounted on a valve actuator.

It is a further object of the present invention to provide a valve position monitor or an integrated control and monitoring assembly with easily seen visual indicators displaying the position of the valve.

These and other objects and advantages will become readily apparent upon a reading of the description herein along with the appended drawings.

SUMMARY OF THE INVENTION

The present invention is a valve control and monitoring assembly that can be transversely mounted on any ISO and NAMUR standard rotary valve actuator. For purposes of this description, a transversely mounted assembly is an assembly that is positioned substantially alongside the upwardly extending auxiliary shaft of the rotary valve actuator, rather than directly above the auxiliary shaft. The control and monitoring assembly includes a targeting device and light-emitting diodes that provide for immediate visual indication as to the position of the valve, and also may include a pneumatic valve for effectuating opening and closing of the valve.

DESCRIPTION OF THE PREFERRED EMBODIMENTS

Figure 1:
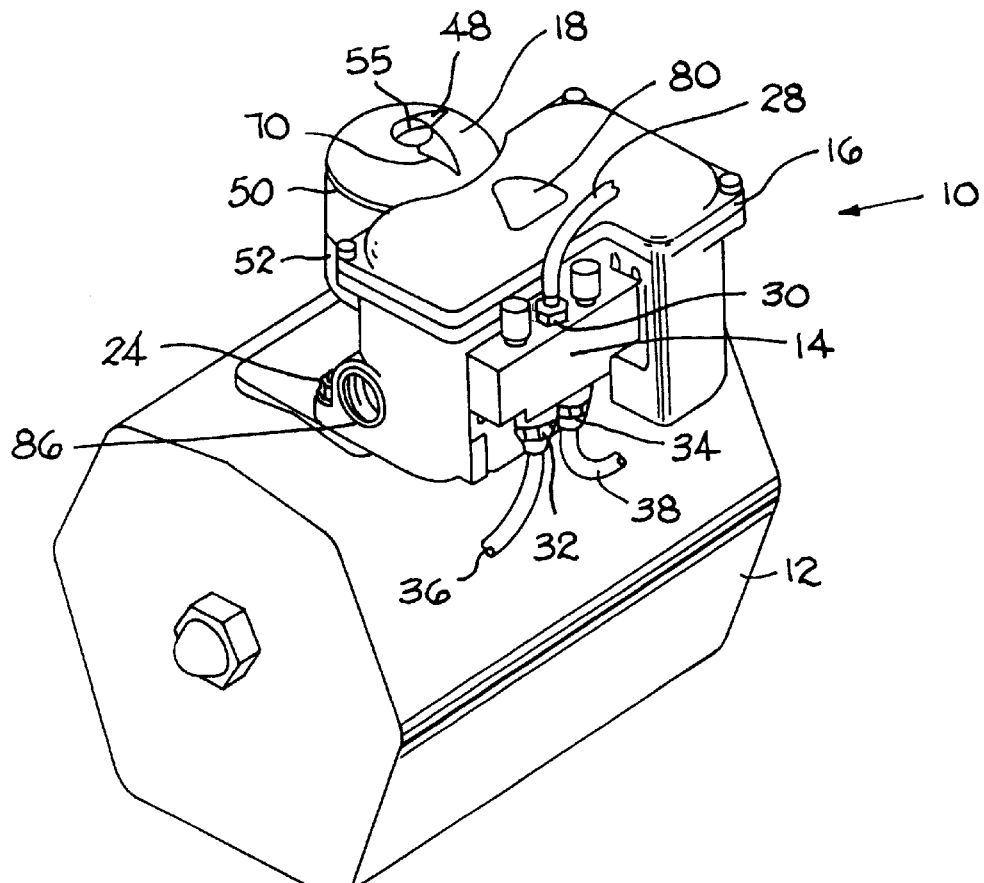
FIG. 1 is a perspective view of a preferred control and monitoring assembly in accordance with the present invention mounted on a rotary valve actuator.

As shown in FIGS. 1–4, a preferred control and monitoring assembly 10 made in accordance with the present invention is mounted on the upper surface of a rotary actuator 12. Such an actuator 12 can be used to drive many types of valves, including damper, butterfly, ball, and plug valves. This preferred assembly 10 comprises three essential components: a pneumatic valve 14 which controls the release of air into the actuator 12, a control housing 16, and a targeting device 18 for providing visual indication as to the position of the driven valve.

Figure 2:
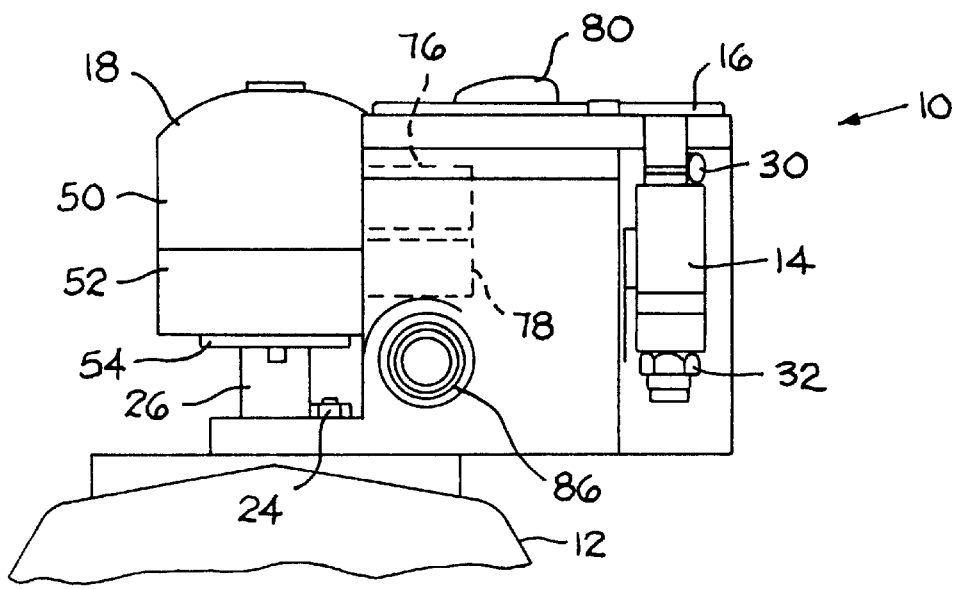
FIG. 2 is an end view of the control and monitoring assembly of FIG. 1.
Figure 3:
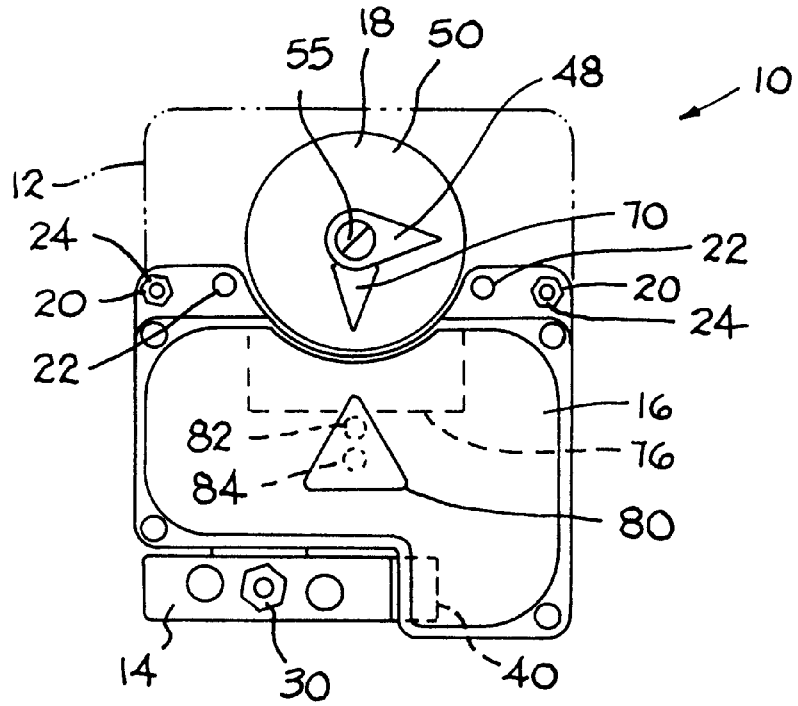
FIG. 3 is a top view of the control and monitoring assembly of FIG. 1.
Figure 4:
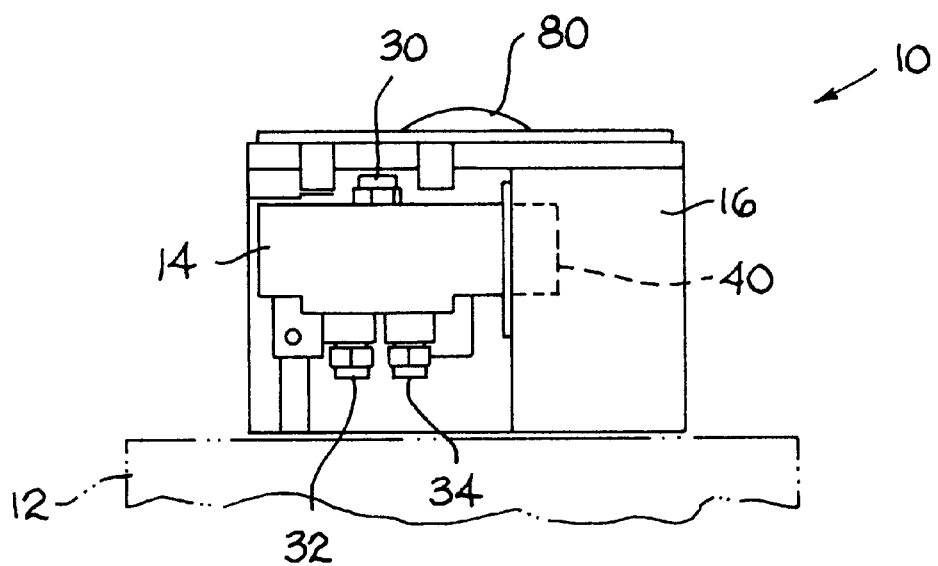
FIG. 4 is a side view of the control and monitoring assembly of FIG. 1.
Figure 5:
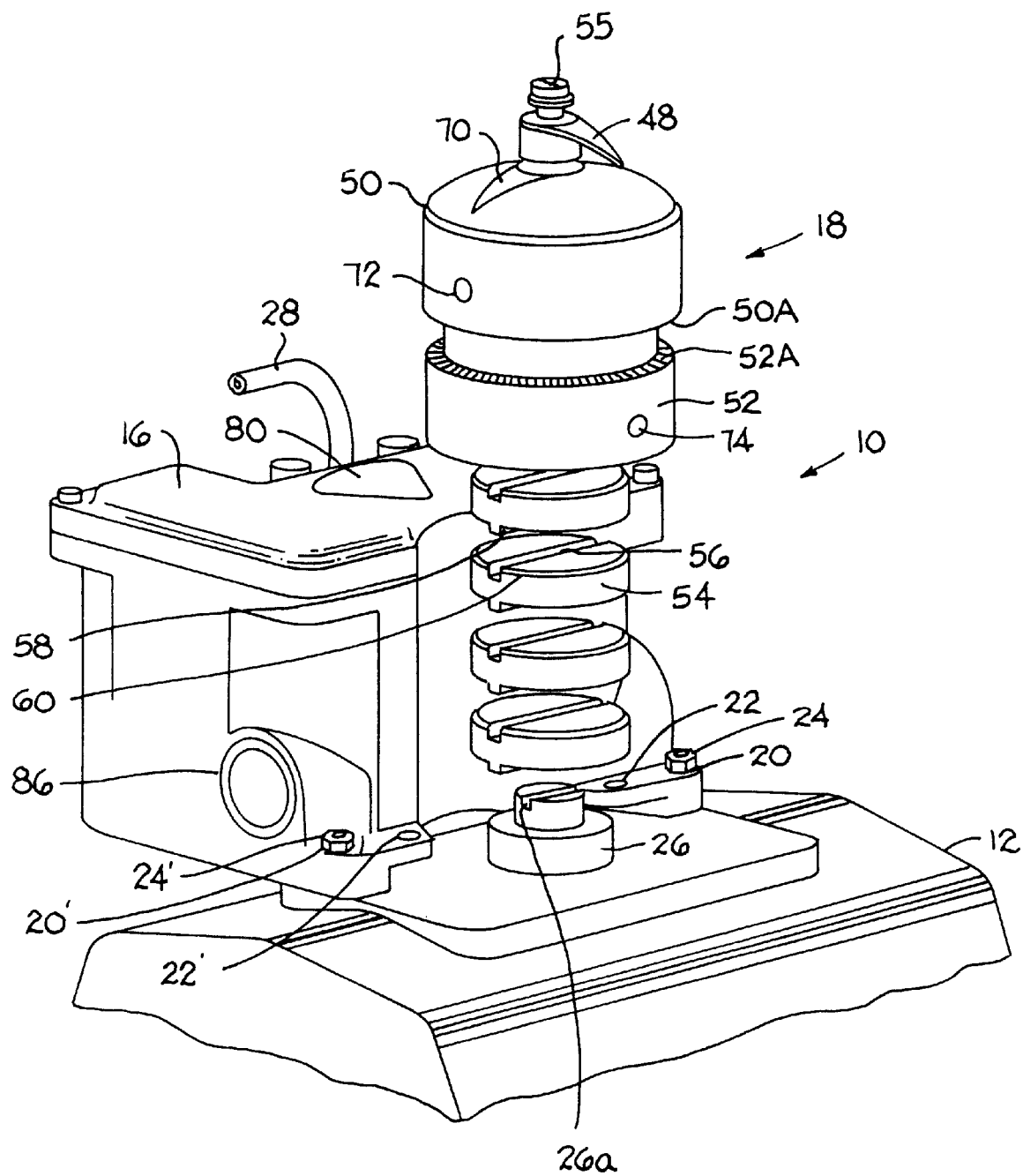
FIG. 5 is an exploded perspective view of the targeting device of the control and monitoring assembly of FIG. 1.

Unlike prior art control and monitoring assemblies, the mounting of this assembly 10 requires no brackets or custom installation because it beneficially utilizes mounting locations prescribed by ISO and NAMUR standards. These standards prescribe the location for mounting holes along the upper surface of an actuator. As best shown in FIGS. 3 and 5, the assembly 10 of the present invention provides two pairs of mounting holes 20, 20', 22, 22' along the base of the control housing 16 which correspond to ISO and NAMUR standard mounting locations on the actuator 12. In this embodiment, two screws 24, 24', or similar fasteners, are used to secure the assembly 10 to the housing of the actuator 12, directly atop the actuator 12, with the targeting device 18 receiving an auxiliary shaft 26 (as shown in FIG. 2) which extends from the actuator 12. Most importantly, the assembly 10 is transversely mounted to the actuator 12, that is, the control housing 16 is positioned to the side of the upwardly extending auxiliary shaft 26 of the actuator 12, rather than directly above the auxiliary shaft 26, as is typical in prior art valve position monitors. This positioning of the assembly 10 allows the pneumatic ports (not shown) of the actuator 12 to be aligned with the pneumatic valve 14 of the assembly 10, as will be further described. Although not shown in the Figures, positioning the assembly 10 in this manner also permits a second control housing to be "mirror mounted" to the opposite side of the targeting device 18, which is secured to the auxiliary shaft 26 of the valve actuator 12.

Referring again to FIGS. 1–4, the pneumatic valve 14 has an inlet port 30 preferably located on its upper surface. The pneumatic valve 14 receives air from a supply line 28 (shown in FIG. 1) that is coupled to this inlet port 30. The valve 14 is also equipped with two outlet ports 32, 34 on its lower surface. Two feed lines 36, 38 (as shown in FIG. 1) are coupled to these outlet ports 32, 34 and operatively connect the valve 14 to pneumatic ports (not shown) in the side wall of the actuator 12. Because of the transverse mounting of the assembly 10, no complex or lengthy tubing is required to connect the pneumatic valve 14 to the actuator 12 as is made necessary by the overhead positioning of prior art assemblies. Thus, the pneumatic ports of the actuator 12 are generally and advantageously aligned with the outlet ports 32, 34 of the pneumatic valve 14.

The pneumatic valve 14 includes an internal spool (not shown) which is controlled by a solenoid. In this preferred embodiment, the control housing 16 contains this solenoid 40 (indicated in phantom in FIGS. 3 and 4). Upon receiving a signal from a local or remote location, the solenoid 40 shifts the spool, diverting the supply air through the two feed lines 36, 38 into the pneumatic ports of the actuator 12. The actuator 12 converts this pneumatic energy into mechanical energy to open or close the driven valve. Use of such pneumatic valves is well-known in the art.

The control housing 16 also contains the mechanism for monitoring the position of the driven valve and the circuitry for providing visual indication of the valve position, as will be further described. Because the solenoid pilot is internally vented into the pneumatic valve 14, no exhaust port is needed within the control housing 16, and an airtight and watertight seal can be maintained. Prior art assemblies that vent exhaust through the housing cannot be adequately sealed.

Figure 6:
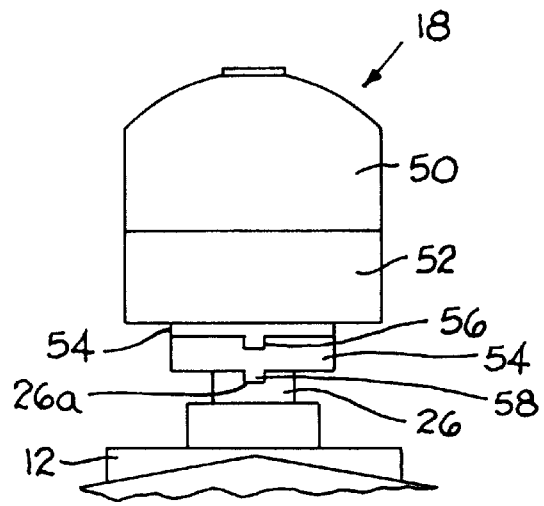
FIG. 6 is a side view of the mounting of the upper and lower targets of the control and monitoring assembly of FIG. 1.
Figure 7:
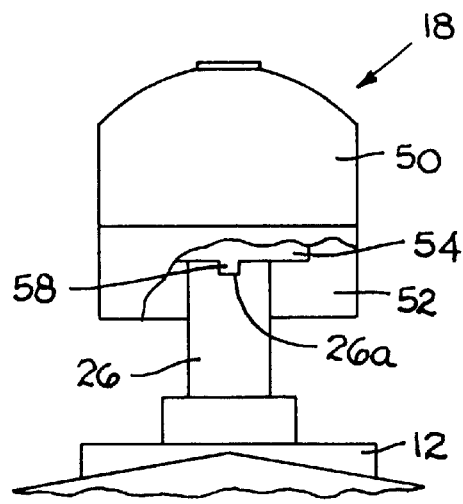
FIG. 7 is a side view of an alternate mounting of the upper and lower targets of the assembly of FIG. 1, wherein one spacer plate is used.

Monitoring of the position of the driven valve is accomplished through use of the targeting device 18. The targeting device 18 is mounted on and keyed to the actuator's vertically extending auxiliary shaft 26, as described below. The targeting device 18 provides immediate visual indication of the position of the driven valve. As best shown in FIG. 5, one preferred embodiment of the targeting device 18 is comprised of a pointer 48, an upper target 50, a lower target 52, and a plurality of spacer plates 54. Each of these components is mounted about a common shaft, such as a screw 55. During installation, this screw 55 is threaded directly into the auxiliary shaft 26 so that the screw 55 is an extension of and rotates with the auxiliary shaft 26, as will be described below. The spacer plates 54 are used to position the upper and lower targets 50, 52 at the proper height relative to the control housing 16. As shown in FIGS. 5–7, the number of spacer plates 54 needed is dependent on the height of the auxiliary shaft 26 to which the targeting device 18 is attached. Each spacer plate 54 has a groove 56, preferably extending across the entire diameter of the plate 54 along the upper surface thereof. Each groove 56 is adapted to receive a corresponding projection, or tongue 58, extending from the lower surface of an adjacent plate 54, thereby allowing the stacking and interlocking of the plates 54. The auxiliary shaft 26 has a similar groove 26a that receives a tongue 58 from the bottommost plate 54 to key the plates 54 to the auxiliary shaft 26. Each spacer plate 54 also has teeth 60 on its upper surface so that the teeth 60 of the uppermost spacer plate 54 are intermeshed with corresponding teeth (not shown) on a bottom surface of the lower target 52. Thus, once installed, the interlocked spacer plates 54 rotate as a group with the lower target 52. By using the appropriate combination of spacer plates 54, the targeting device 18 may be installed on the auxiliary shaft 26 of any ISO and NAMUR standard rotary actuator, irrespective of the shaft's height.

As stated above, the components of the targeting device 18 are mounted on a common screw 55. The pointer 48 and the lower target 52 are keyed so that they always rotate together with the common screw 55. The upper target 50 is not so restricted and may rotate freely about the screw 55 until its position is fixed relative to the lower target 52, as will be further described.

The upper target 50 has an indicia 70 on its top surface that corresponds to the open position of the driven valve. In this preferred embodiment, that indicia is an arrow 70 that points to a reference point on the control housing 16 when the valve is open. Similarly, the pointer 48 corresponds to the closed position of the driven valve and points to a reference point on the control housing 16 when the driven valve is closed. When installing the targeting device 18, the relative positions of the upper target 50 and the pointer 48 must first be established. If a 90-degree rotation of the auxiliary shaft 26 signals the movement of the valve from a fully open position to a fully closed position, the pointer 48 and arrow 70 on the upper target must be separated by a 90-degree rotation. As stated, the upper target 50 rotates freely about the common shaft 55 until it is secured relative to the lower target 52. So, during installation, the upper target 50 is rotated so that the arrow 70 on the upper target 50 and pointer 48 are positioned at the proper rotational angle relative to one another. Since the pointer 48 rotates with the lower target 52, once the appropriate relative position of the arrow 70 on the upper target 50 and pointer 48 is established, this position is fixed by securing the upper target 50 relative to the lower target 52. In this preferred embodiment, the common shaft is a screw 55 that can be tightened into a threaded hole (not shown) defined by and extending through the center of the auxiliary shaft 26, thereby pressing the upper and lower targets 50, 52 together. Adjacent surfaces of the upper and lower targets 50, 52 preferably have teeth 50A, 52A which lock the upper and lower targets 50, 52 together as the screw 55 is tightened. The upper and lower targets 50, 52 can thus be fixed relative to one another at any angle. This is a significant improvement over prior art systems which generally only allow for a 15–30 degree adjustment between the open and closed positions.

FIG. 5 also shows that the upper target 50 includes a magnet 72 that is positioned in a recess in the side wall of the target 50 and corresponds to the angular position of the arrow 70 on the upper surface of the target 50. Similarly, a second magnet 74 is positioned in a recess in the side wall of the lower target 52 and corresponds to the angular position of the pointer 48. The upper magnet 72 is thus adjacent the side wall of the control housing 16 when the driven valve is open, and the lower magnet 74 is adjacent the side wall of the control housing 16 when the driven valve is closed.

As shown in phantom in FIGS. 2 and 3, there are two magnetic proximity switches 76, 78 contained within the control housing 16, an upper switch 76 being positioned to sense the magnet 72 on the upper target 50, and a lower switch 78 being positioned to sense the magnet 74 on the lower target 52. When the targeting device 18 is rotated to indicate that the valve is open, the upper magnet 72 trips the upper proximity switch 76, thereby closing a circuit that illuminates a first light-emitting diode (LED) 82 (shown in phantom in FIG. 3) contained within the control housing 16. When the targeting device 18 is rotated to indicate that the valve is closed, the lower magnet 74 trips the lower proximity switch 78, thereby closing a circuit that illuminates a second LED 84 (shown in phantom in FIG. 3) contained within the control housing 16. The tripping of these proximity switches 76, 78 may also generate a signal that is transmitted to a local or remote location.

As shown in the Figures, the control housing 16 is equipped with a lens 80 on its upper surface through which the LEDs can be viewed. To ensure that the light is bright and can be easily seen, the lens 80 is preferably treated with a diffusion pigment for maximum light dispersion. In this preferred embodiment, a green arrow 58 and a green LED are used to indicate that the valve is open. A red pointer 48 and a red LED are used to indicate that the valve is closed. Although red and green are the preferred colors for indicating open and closed valve positions, any suitable color combinations may be used. In this manner, the position of the valve can be visually ascertained even if it is difficult to see the targeting device 18.

It is also important to note that the preferred physical embodiment of the LED circuits described above is a simple circuit board (not shown) that operably connects the LEDs 82, 84 to the associated switches 76, 78. Such simple circuit boards are well known in the art. Also, since the tripping of the proximity switches 76, 78 may generate a signal that is transmitted to a local or remote control station, the control housing 16 preferably contains a common terminal block (not shown) for facilitating the physical connection of the circuits to one or more wires for transmitting the signals. The installation and use of such terminal blocks is also well known in the art. In this regard, the control housing 16 is preferably provided with aligned openings 86 at either end for attachment of the assembly 10 to standard conduit.

Figure 10:
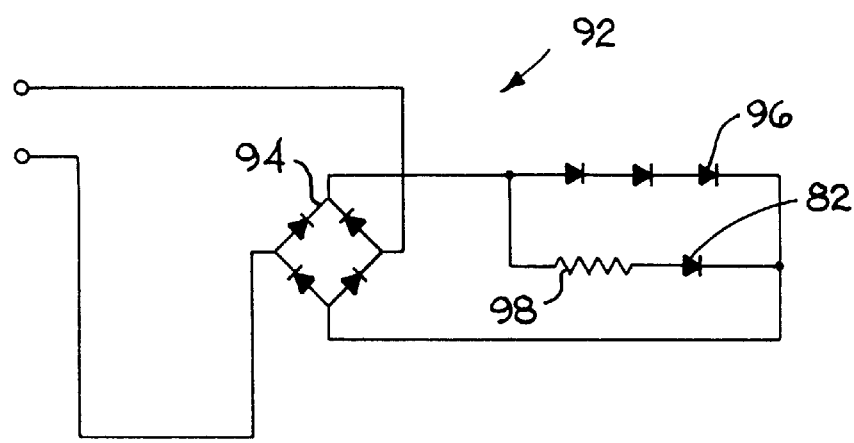
FIG. 10 is a schematic view of an LED circuit used in conjunction with the control and monitoring assemblies shown in FIGS. 1 and 8.

A preferred circuit for illuminating one of the light-emitting diodes 82 is shown in FIG. 10. The LED 82 is contained within a branch circuit 92. In this branch circuit 92, a bridge rectifier 94 is used to convert alternating current into direct current, and a series of diodes 96 are used create a voltage drop in the circuit 92. Finally, to create a current flowing through the LED 82, a dropping resistor 98 is positioned in series with the LED 82. A second identical branch circuit is used to control current flow through the second LED 84.

Figure 8:
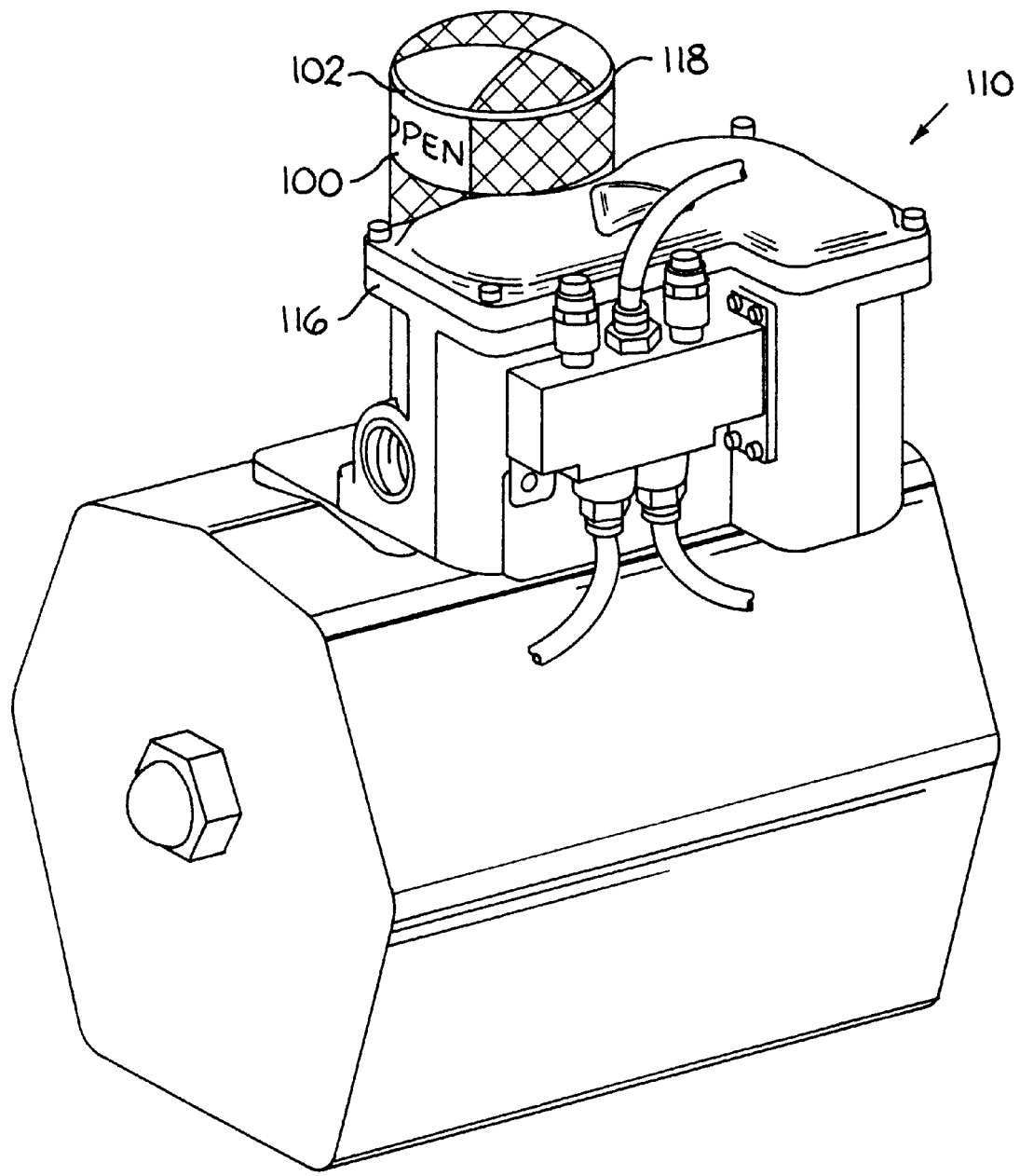
FIG. 8 is a perspective view of an alternate embodiment of a control and monitoring assembly in accordance with the present invention mounted on a rotary valve actuator.
Figure 9:
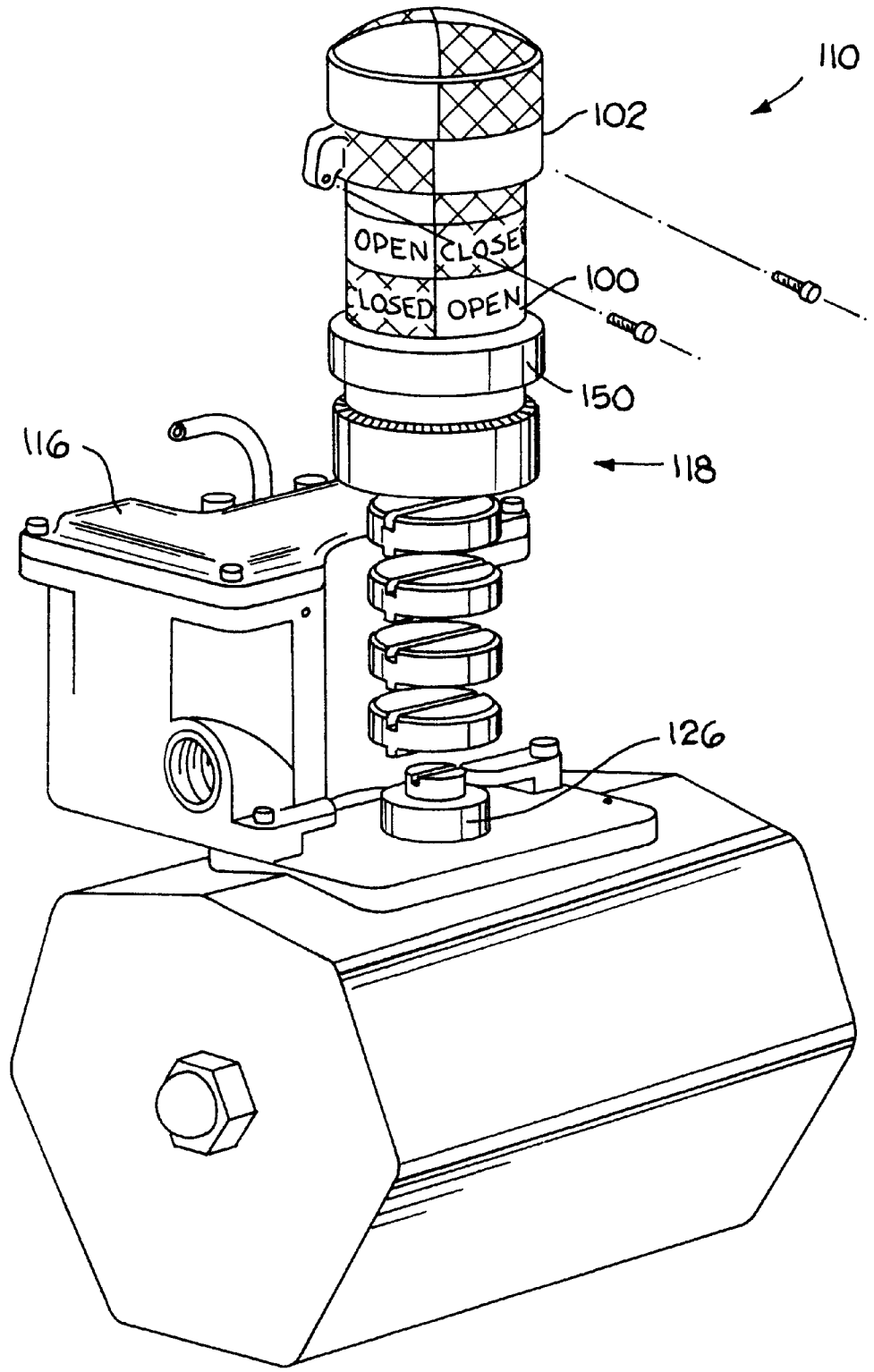
FIG. 9 is an exploded perspective view of the targeting device of the control and monitoring assembly of FIG. 8.

FIGS. 8 and 9 of the present application show an alternate embodiment of the control and monitoring assembly of the present invention, generally indicated by reference numeral 110. This assembly 110 is identical to the above-described embodiment, except that the targeting device 118 has been modified.

Specifically, in this alternate embodiment, an indicator drum 100 is integrated with the upper target 150 for providing immediate visual indication as to the position of the driven valve. This particular indicator drum 100, as shown in FIGS. 8 and 9, however, can only be used when the open and closed positions of the driven valve correspond with a 90-degree rotation of the auxiliary shaft 126.

The preferred indicator drum 100 is marked with indicia that generally partition the drum 100 into quadrants. In this particular embodiment shown and described, there are actually upper and lower indicia that partition the drum 100 into upper and lower quadrants. As is best shown in FIG. 9, the defined quadrants of the drum 100 are alternatively marked or color-coded for indicating whether the driven valve is open or closed. In other words, as shown in FIG. 9, the first and third upper quadrants are preferably labeled "OPEN," and the second and fourth upper quadrants are preferably labeled "CLOSED." Similarly, the first and third lower quadrants are preferably labeled "CLOSED," and the second and fourth lower quadrants are preferably labeled "OPEN."

As a further refinement, it is desirable to have the quadrants labeled "OPEN" color-coded green, and the quadrants labeled "CLOSED" color-coded red.

The targeting device 118 in this alternate embodiment further includes a substantially transparent viewing cover 102 secured to the control housing 116 of the assembly 110. This viewing cover 102 is similarly partitioned into quadrants, alternative quadrants being masked and substantially opaque, as indicated by the cross-hatched lines in FIG. 9. As shown, this viewing cover 102 is adapted to be fit over the drum 100, but since it is secured to the control housing 116, the cover 102 does not rotate with the upper target 50 and indicator drum 100. Since alternative quadrant portions of the viewing cover 102 are masked, when the driven valve is closed, only the red or "CLOSED" quadrants may be seen through the cover 102. Similarly, when the driven valve is open, only the green or "OPEN" quadrants may be seen through the cover 102.

In this preferred embodiment, the indicator drum 100 is partitioned into quadrants; however, the indicator drum 100 and associated viewing cover 102 could be partitioned into halves, eighths, or any other finite fractions associated with the rotation of the auxiliary shaft 26 from a fully open to a fully closed position.

Although integrated control and monitoring assemblies are described above and shown in the appended drawings, it is important to note that the monitoring portion of the assembly (which does not require, but may receive an auxiliary valve and solenoid) may be mounted to a rotary valve actuator that already has an actuator control system in place.

It is understood that changes may be made in the construction and arrangement of the various components of the present invention without departing from the spirit or scope of the invention as described herein.

What is claimed is:

1. An integrated valve control and monitoring assembly for indicating the open and closed positions of a driven valve, said assembly being associated with a rotary actuator for said driven valve, comprising:

a targeting device mounted to an auxiliary shaft extending from said rotary actuator for providing immediate visual indication as to the position of said driven valve;

a control housing secured to said rotary actuator and positioned alongside said targeting device, thereby transverse to the auxiliary shaft of said rotary actuator;

a pneumatic valve secured to an outer surface of said control housing for controlling a supply of air to said rotary actuator for opening or closing said driven valve; and a solenoid positioned within said control housing for activating said pneumatic valve.

2. An integrated valve control and monitoring assembly as recited in claim 1, wherein said targeting device comprises:

a common shaft secured to and extending from the auxiliary shaft of said rotary actuator and terminating at a distal end thereof, said common shaft rotating with the auxiliary shaft of said rotary actuator;

a lower target mounted on said common shaft, said lower target being appropriately keyed to rotate with the common shaft; and an upper target mounted on said common shaft above said lower target, and having an indicia on an external surface thereof for providing immediate visual indication of the position of the upper target relative to a predetermined reference point, said upper target being selectively and adjustably secured to said lower target for rotation therewith, the angular position of said upper target relative to said lower being selected to correspond to the rotation of the driven valve from a fully open position to a fully closed position.

3. An integrated valve control and monitoring assembly as recited in claim 2, wherein said targeting device further comprises a pointer that is mounted on said common shaft at the distal end thereof, said pointer being appropriately keyed to rotate with the common shaft and said lower target.

4. An integrated valve control and monitoring assembly as recited in claim 3, wherein alignment of said pointer with said predetermined reference point provides immediate visual indication of the fully closed position of said driven valve, and alignment of the indicia on the external surface of said upper target with said predetermined reference point provides immediate visual indication of the fully open position of said driven valve.

5. An integrated valve control and monitoring assembly as recited in claim 2,
wherein the common shaft of said targeting device is a screw that is tightened into a threaded hole defined by and extending through said auxiliary shaft, and
wherein adjacent surfaces of said upper and lower targets have a plurality of intermeshing teeth which secure said upper and lower targets together as the screw is tightened.

6. An integrated valve control and monitoring assembly as recited in claim 2, wherein said targeting device further comprises a plurality of spacer plates, one or more of said spacer plates being mounted on said common shaft below said lower target for adjusting the height of said upper and lower targets relative to said control housing.

7. An integrated valve control and monitoring assembly as recited in claim 2, and further comprising:
a first magnet secured to and carried by said upper target;
a second magnet secured to and carried by said lower target;
a first magnetic switch contained within said control housing adjacent said targeting device and responsive to said first magnet, said first magnet causing the first magnetic switch to close as said first magnet is rotated to a position adjacent said control housing,
a second magnetic switch contained within said control housing adjacent said targeting device and responsive to said second magnet, said second magnet causing the second magnetic switch to close as said second magnet is rotated to a position adjacent said control housing.

8. An integrated valve control and monitoring assembly as recited in claim 7,
wherein said upper target is mounted to said common shaft such that said first magnetic switch is closed by said first magnet when the driven valve is in the fully open position, and
wherein said lower target is mounted to said common shaft such that said second magnetic switch is closed by said second magnet when the driven valve is in the fully closed position.

9. An integrated valve control and monitoring assembly as recited in claim 8,
wherein the closing of said first magnetic switch causes a transmission of a signal to a remote location that said driven valve is in the fully open position; and
wherein the closing of said second magnetic switch causes a transmission of a signal to a remote location that said driven valve is in the fully closed position.

10. An integrated valve control and monitoring assembly as recited in claim 8,
wherein the closing of said first magnetic switch causes an illumination of a first light-emitting diode for providing immediate visual indication that said driven valve is in the fully open position; and
wherein the closing of said second magnetic switch causes an illumination of a second light-emitting diode for providing immediate visual indication that said driven valve is in the fully closed position.

11. An integrated valve control and monitoring assembly as recited in claim 1, wherein said targeting device comprises:
a common shaft secured to and extending from the auxiliary shaft of said rotary actuator and terminating at a distal end thereof, said common shaft rotating with the auxiliary shaft of said rotary actuator;
a lower target mounted on said common shaft, said lower target being appropriately keyed to rotate with the common shaft;
an upper target mounted on said common shaft above said lower target;
an indicator drum integral with said upper target, said indicator drum having an external surface partitioned into quadrants, first and third quadrants being marked with a first indicia, and second and fourth quadrants being marked with a second indicia; and
a viewing cover secured to said control housing and fitting over and around said indicator drum, the external surface of said drum bring partitioned into quadrants, first and third quadrants being substantially transparent and second and fourth quadrants being substantially opaque, such that the first and third quadrants of said indicator drum are viewable through the transparent quadrants of said cover when the driven valve is in the open position, and said second and fourth quadrants of said indicator drum are viewable through the transparent quadrants of said cover when the driven valve is in the closed position.

12. An integrated valve control and monitoring assembly as recited in claim 11, wherein said targeting device further comprises a plurality of spacer plates, one or more of said spacer plates being mounted on said common shaft below said lower target for adjusting the height of said upper and lower targets relative to said control housing.

13. An integrated valve control and monitoring assembly as recited in claim 11, and further comprising:
a first magnet secured to and carried by said upper target;
a second magnet secured to and carried by said lower target;
a first magnetic switch contained within said control housing adjacent said targeting device and responsive to said first magnet, said first magnet causing the first magnetic switch to close as said first magnet is rotated to a position adjacent said control housing,
a second magnetic switch contained within said control housing adjacent said targeting device and responsive to said second magnet, said second magnet causing the second magnetic switch to close as said second magnet is rotated to a position adjacent said control housing.

14. An integrated valve control and monitoring assembly as recited in claim 13,
wherein said upper target is mounted to said common shaft such that said first magnetic switch is closed by said first magnet when the driven valve is in the fully open position, and wherein said lower target is mounted to said common shaft such that said second magnetic switch is closed by said second magnet when the driven valve is in the fully closed position.

15. An integrated valve control and monitoring assembly as recited in claim 14, wherein the closing of said first magnetic switch causes a transmission of a signal to a remote location that said driven valve is in the fully open position; and wherein the closing of said second magnetic switch causes a transmission of a signal to a remote location that said driven valve is in the fully closed position.

16. An integrated valve control and monitoring assembly as recited in claim 14, wherein the closing of said first magnetic switch causes an illumination of a first light-emitting diode for providing immediate visual indication that said driven valve is in the fully open position; and wherein the closing of said second magnetic switch causes an illumination of a second light-emitting diode for providing immediate visual indication that said driven valve is in the fully closed position.

17. A valve monitoring assembly for indicating the open and closed positions of a driven valve, said assembly being associated with a rotary actuator for said driven valve, comprising:

a targeting device mounted to an auxiliary shaft extending from said rotary actuator for providing immediate visual indication as to the position of said driven valve;

a control housing secured to said rotary actuator and positioned alongside said targeting device, thereby transverse to the auxiliary shaft of said rotary actuator, the rotational position of the said targeting device relative to a reference point indicated on said control housing corresponding to the rotational position of said driven valve.

18. A valve monitoring assembly as recited in claim 17, and further comprising a pneumatic valve secured to an outer surface of said control housing for controlling a supply of air to said rotary actuator for opening or closing said driven valve; and a solenoid positioned within said control housing for activating said pneumatic valve.

19. A valve monitoring assembly as recited in claim 17, wherein said targeting device comprises:

a common shaft secured to and extending from the auxiliary shaft of said rotary actuator and terminating at a distal end thereof, said common shaft rotating with the auxiliary shaft of said rotary actuator;

a lower target mounted on said common shaft, said lower target being appropriately keyed to rotate with the common shaft; and an upper target mounted on said common shaft above said lower target, and having an indicia on an external surface thereof for providing immediate visual indication of the position of the upper target relative to a predetermined reference point, said upper target being selectively and adjustably secured to said lower target for rotation therewith, the angular position of said upper target relative to said lower being selected to correspond to the rotation of the driven valve from a fully open position to a fully closed position.

20. A valve monitoring assembly as recited in claim 19, and further comprising:

a first magnet secured to and carried by said upper target;

a second magnet secured to and carried by said lower target;

a first magnetic switch contained within said control housing adjacent said targeting device and responsive to said first magnet, said first magnet causing the first magnetic switch to close as said first magnet is rotated to a position adjacent said control housing, a second magnetic switch contained within said control housing adjacent said targeting device and responsive to said second magnet, said second magnet causing the second magnetic switch to close as said second magnet is rotated to a position adjacent said control housing.

21. A valve monitoring assembly as recited in claim 20, wherein said upper target is mounted to said common shaft such that said first magnetic switch is closed by said first magnet when the driven valve is in the fully open position, and wherein said lower target is mounted to said common shaft such that said second magnetic switch is closed by said second magnet when the driven valve is in the fully closed position.

22. A valve monitoring assembly as recited in claim 21, wherein the closing of said first magnetic switch causes a transmission of a signal to a remote location that said driven valve is in the fully open position; and wherein the closing of said second magnetic switch causes a transmission of a signal to a remote location that said driven valve is in the fully closed position.

23. A valve monitoring assembly as recited in claim 21, wherein the closing of said first magnetic switch causes an illumination of a first light-emitting diode for providing immediate visual indication that said driven valve is in the fully open position; and wherein the closing of said second magnetic switch causes an illumination of a second light-emitting diode for providing immediate visual indication that said driven valve is in the fully closed position.

* * * * *